United States Patent [19]

Campian

[11] Patent Number: 5,487,630

[45] Date of Patent: Jan. 30, 1996

[54] MACHINE FOR CUTTING A WORKPIECE MADE OF STYROFOAM OR LIKE MATERIAL

[76] Inventor: Jonathon Campian, 1900 E. 14 Mile Rd., Madison Heights, Mich. 48071

[21] Appl. No.: 386,276

[22] Filed: Feb. 9, 1995

Related U.S. Application Data

[62] Division of Ser. No. 208,616, Mar. 9, 1994, Pat. No. 5,429,460.

[51] Int. Cl.[6] ............................................. B23C 9/00
[52] U.S. Cl. .................................... 409/225; 269/21
[58] Field of Search .................................. 409/137, 134, 409/79, 219, 218, 220, 225; 144/251 R; 269/21

[56] References Cited

U.S. PATENT DOCUMENTS

| | | | |
|---|---|---|---|
| 2,782,574 | 2/1957 | Copold | 269/21 X |
| 2,963,058 | 12/1960 | Carlson | 144/110 |
| 3,157,094 | 11/1964 | Swanson | 90/14 |
| 3,694,099 | 9/1972 | Nicholas | 408/58 |
| 3,734,099 | 5/1973 | Bender et al. | 128/305 |
| 4,036,308 | 7/1977 | Dellenberg | 173/75 |
| 4,154,998 | 5/1979 | Luft et al. | 269/21 X |
| 4,313,506 | 2/1982 | O'Connell | 175/410 |
| 4,531,329 | 7/1985 | Huber | 51/273 |
| 4,729,195 | 3/1988 | Berger | 51/170 |
| 4,818,154 | 4/1989 | Bye | 408/111 |
| 4,839,995 | 6/1989 | Hutchins | 51/170 |
| 4,932,163 | 6/1990 | Chilton | 51/170 |
| 5,035,409 | 7/1991 | Mulliner | 269/21 |
| 5,048,804 | 9/1991 | Ito | 269/21 |
| 5,116,174 | 5/1992 | Fried et al. | 409/79 |
| 5,141,212 | 8/1992 | Beeding | 269/21 |
| 5,316,255 | 5/1994 | Marcusen | 269/21 X |

FOREIGN PATENT DOCUMENTS

| | | | |
|---|---|---|---|
| 339595 | 11/1989 | European Pat. Off. | 409/137 |
| 2548100 | 12/1977 | Germany | 408/58 |
| 148023 | 5/1981 | Germany | 269/21 |
| 3208864 | 9/1983 | Germany | 269/21 |
| 4413745 | 4/1965 | Japan | 408/58 |
| 130112 | 6/1987 | Japan | 408/58 |
| 62346 | 3/1988 | Japan | 269/21 |
| 206643 | 8/1989 | Japan | 269/21 |
| 98737 | 4/1991 | Japan | 409/137 |
| 561748 | 9/1993 | Japan | 269/21 |
| 6055401 | 3/1994 | Japan | 409/134 |

Primary Examiner—William Briggs
Attorney, Agent, or Firm—Gifford, Krass, Groh, Sprinkle, Patmore, Anderson & Citkowski

[57] ABSTRACT

A machine is disclosed for cutting a workpiece made of styrofoam or like material. The machine includes a frame having a generally planar base adapted to support the workpiece. A rotary cutter is supported above the workpiece and is rotatably driven about an axis perpendicular to the base of the frame. The rotary cutter is mounted to a carriage which is moveable on a slide in a first direction parallel to the base of the frame. The slide, in turn, is movably mounted to the frame in a second direction which is also parallel to the plane of the base but perpendicular to the first direction. The rotary cutter is also movably mounted to the carriage in a direction generally perpendicular to the plane of the base so that the cutter is moveable along all three or orthogonal axes. The cutter includes a plurality of radial bores which are fluidly connected with an axial bore in the cutter. A source of vacuum is applied to the cutter axial bore so that debris caused during the cutting operation is evacuated by a vacuum source through the cutter and to a debris collection area.

7 Claims, 3 Drawing Sheets

MACHINE FOR CUTTING A WORKPIECE MADE OF STYROFOAM OR LIKE MATERIAL

This is a divisional of application Ser. No. 08/208,616 filed on Mar. 9, 1994, now U.S. Pat. No. 5,429,460.

BACKGROUND OF THE INVENTION

I. Field of the Invention

The present invention relates to a machine for cutting a workpiece made of styrofoam or like material.

II. Description of the Prior Art

Forms made of styrofoam or similar material are frequently used in casting operations. Such forms are typically cut in the shape of the desired casting and the mold material, typically green sand, is then applied to the outside of the styrofoam form. The styrofoam form is then liquified by heating and removed from the sand mold. After its removal, the sand mold is filled with the molten metal in the conventional fashion thus forming the casting.

It has been the previous practice to construct the styrofoam forms by hand cutting the styrofoam from styrofoam blocks. For large castings, multiple blocks are individually cut and the resulting forms are then laminated together to form the final styrofoam form.

The previously known method of hand cutting the styrofoam forms to the desired shape, however, suffers from a number of disadvantages. One disadvantage is that, as in all hand operations, it is virtually impossible to obtain high accuracy of the final styrofoam form. Such inaccuracies in cutting the styrofoam form by hand may require additional machining of the final casting.

A still further disadvantage of cutting the styrofoam form by hand is that measuring and layout errors can and do occur. Depending upon the magnitude of such errors, destruction of the styrofoam form may be necessary.

A still further disadvantage of hand curing styrofoam forms is that the hand tools used to cut the styrofoam can only obtain a relatively rough cut of the styrofoam. This rough cut results from the cellular or bead nature of the styrofoam so that, when hand cutting a occurs, the beads or cells of the styrofoam pull away from the styrofoam block and leave a rough surface. Such a rough surface will cause a correspondingly rough surface on the sand mold and a like rough surface on the finished casting. Such rough surfaces disadvantageously increase the amount of machining required for the final cast iron part.

SUMMARY OF THE PRESENT INVENTION

The present invention provides a machine which overcomes all of the above mentioned disadvantages of the previously known devices.

In brief, the machine of the present invention comprises a frame having a generally planar base adapted to support the styrofoam workpiece. Preferably, a vacuum system is selectively coupled to the base so that the vacuum, acting on the workpiece, secures the workpiece to the frame against movement.

A pair of elongated screws are also secured to the frames so that the screws are spaced above the frame base and are spaced apart and parallel to each other. Furthermore, the axes of each screw is parallel to the plane of the base.

A slide extends between the screws and thus over the top of the frame base. The slide includes a pair of nuts which threadably engage the screws. The nuts are rotatably driven by motors under computer control so that, by rotatably driving the nuts, the slide moves in a first direction which is parallel to the plane, of the base.

A carriage assembly, in turn, is slidably mounted to the slide in a second direction which is also parallel to the plane of the base, but, perpendicular to the first direction. A ball screw and nut assembly operatively connected between the carriage and the slide allows accurate positioning of the carriage assembly relative to the slide and this movement is also under computer control.

A cutter housing is secured to the carriage. The cutter housing includes a generally cylindrical cutter which is rotatably driven about its longitudinal axis. Furthermore, the rotary cutter is secured to a tube which in turn is longitudinally axially slidably mounted with respect to the cutter housing in the direction perpendicular to the base of the frame. A controllable motor, such a stepping motor or DC servo motor, controls the vertical position of the rotary cutter with respect to the base of the frame.

The slide, carriage assembly and rotor mounting assembly thus enables the position of the rotary cutter to be controlled in all three orthogonal axes. Furthermore, the position of the slide, carriage assembly and cutter housing assembly are all performed under computer control thereby allowing accurate position of the cutter relative to the base of the frame and thus relative to the workpiece.

In the preferred embodiment of the invention, the rotary cutter includes a plurality of radially extending openings which fluidly communicate with an axial bore formed through the rotary cutter. This axial bore, in turn, is fluidly connected to a source of vacuum. Thus, during the cutting operation, air along with entrained debris formed during the cutting operation on the workpiece is evacuated directly through the cutter by the vacuum source and to a waste collection area. In practice, this waste collection area becomes filled with small particles of styrofoam which are then recycled.

SUMMARY OF THE PRESENT INVENTION

A better understanding of the present invention will be had upon reference to the following detailed description, when read in conjunction with the accompany drawing, wherein like reference characters refer to like parts throughout the several views, and in which.

DETAILED DESCRIPTION OF A PREFERRED EMBODIMENT OF THE PRESENT INVENTION

Figure 1:
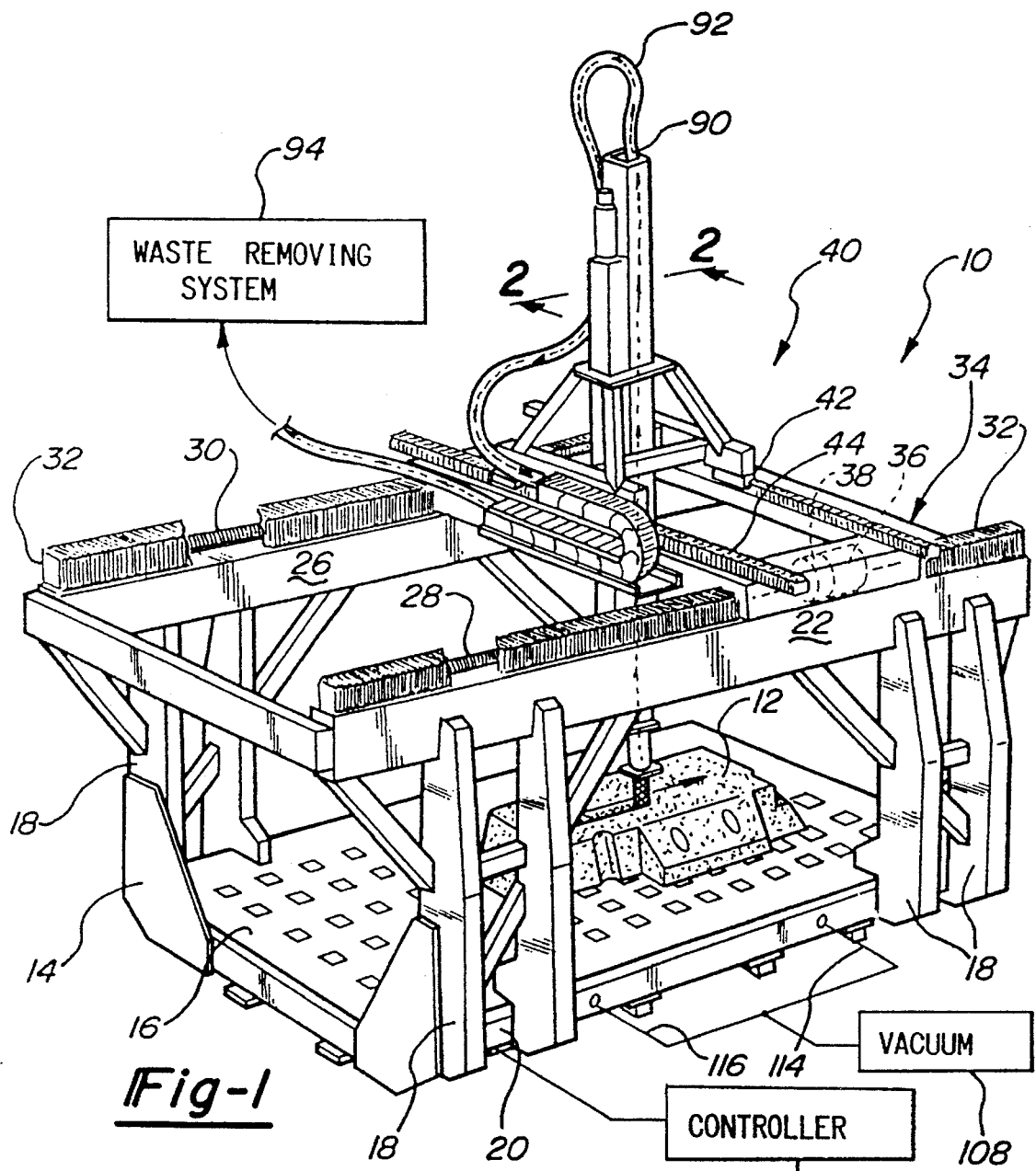
FIG. 1 is an elevational view illustrating a preferred embodiment of the present invention.

With reference first to FIG. 1, a preferred embodiment of the styrofoam cutting machine 10 is thereshown for cutting a styrofoam workpiece 12. The machine 10 includes a frame 14 having a generally planar base 16. Furthermore, as shown in FIG. 1, the base 16 lies in a generally horizontal plane and supports a bottom of the workpiece 12 in a fashion that will be subsequently described in greater detailed.

Still referring to FIG. 1, the base 16 is generally rectangular in shape and includes a pair of upright supports 18 adjacent each corner. The upright supports 18 along one side 20 of the base 16 support an elongated rail 22 at their upper ends so that the rail 22 is spaced above and generally parallel to the plane of the base 16. Similarly, the upright supports 18 along the opposite side 24 of the base 16 support a second rail 26 at their upper ends so that the rails 22 and 26 are spaced apart and parallel to each other.

A first elongated screw 28 is secured at its ends to the ends of the first rail 22. Similarly, a second screw 30 is secured at its ends to the ends of the second rail 26 so that the screws 28 and 30 are spaced apart and parallel to each other. A bellows 32 covers each screw 28 and 30 to protect the screws 28 and 30 from dirt and other debris.

Still referring to FIG. 1, a slide assembly 34 extends across the rails 22 and 26 and is linearly secured by a nut 36 (only one shown) to each of the screws 28 and 30. Consequently, rotation of the nuts 36 linearly moves the slide assembly 34 in a first direction which is parallel to but spaced above the plane of the frame base 16. Any conventional controllable motor means 38, such a stepping motor or DC servo motor, can be used to rotatably drive each nut 36.

Figure 2:
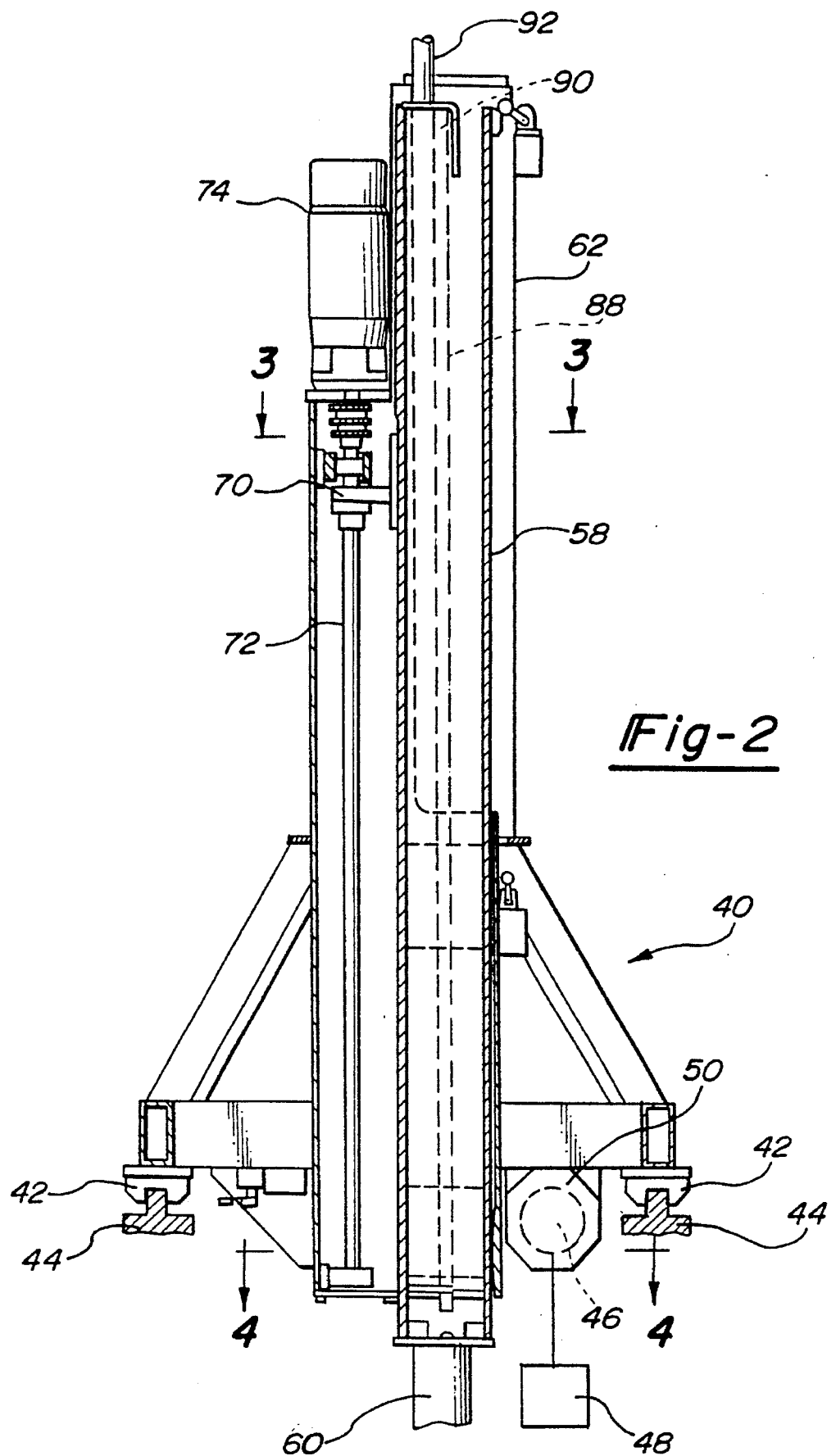
FIG. 2 is a sectional view taken substantially along line 2—2 in FIG. 1 and enlarged for clarity.
Figure 5:
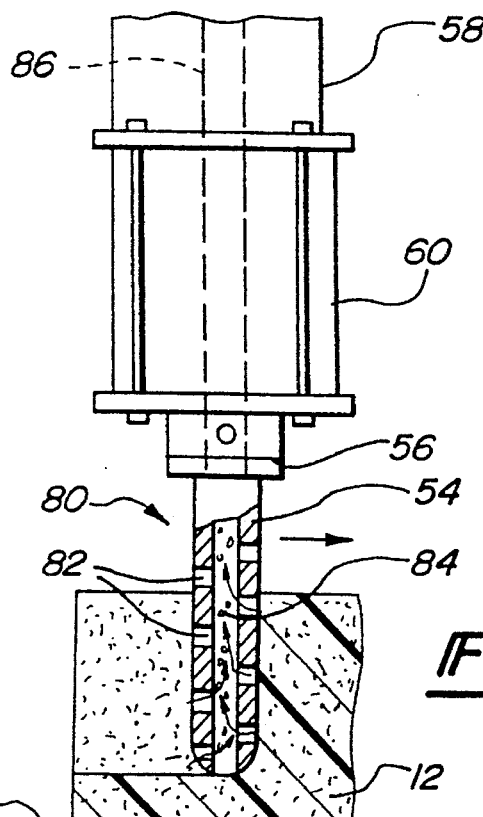
FIG. 5 is a fragmentary partial sectional view illustrating the operation of the present invention.

As best shown in FIGS. 1 and 2, a carriage assembly 40 includes a pair of spaced apart and parallel tracks 42 (FIG. 2). These tracks 42 cooperate with a pair of spaced and elongated rails 44 formed on the slide assembly 34.

The rails 44 extend in the direction parallel to and spaced above the plane of the frame base 16. Furthermore, the rails 44 extend in the direction perpendicular to the direction of the screws 28 and 30.

Referring now to FIG. 2, in order to move the carriage assembly 40 longitudinally along the rails 44, a ball screw 46 is mounted to the slide assembly 34 and is rotatably driven by a conventional controllable motor 48 (illustrated diagrammatically only). This ball screw 46, furthermore, cooperates with a nut 50 which is secured against rotation to the carriage assembly 40. Consequently, rotation of the ball screw 46 longitudinally drives the carriage assembly 40 along the rails 44.

With reference now especially to FIGS. 2–5, a generally cylindrical rotary cutter 54 is rotatably mounted by a chuck assembly 56 to an elongated tubular cutter housing 58. A motor 60 attached to the tubular housing 58 is rotatably drivingly connected with the rotary cutter 54.

Figure 3:
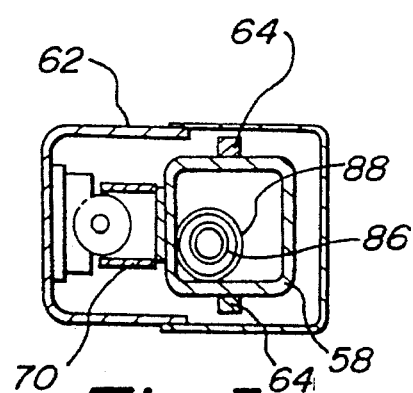
FIG. 3 is a cross sectional view taken substantially along line 3—3 in FIG. 2.
Figure 4:
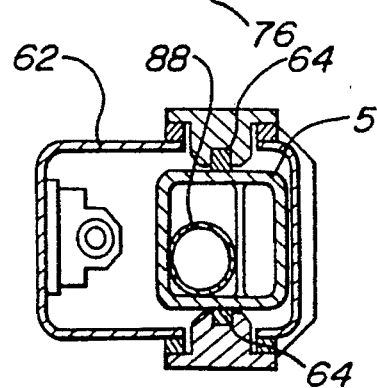
FIG. 4 is a cross sectional view taken substantially along line 4—4 in FIG. 2.

As best shown in FIGS. 2–4, the cutter housing 58 is telescopically slidably mounted within a rectangular housing 62 on the carriage assembly 40. Furthermore, as best shown in FIGS. 3 and 4, a pair of guides 64 are secured to the carriage housing 62 and guide the cutter support housing 58 as it longitudinally moves within the carriage housing 62.

As best shown in FIGS. 2 and 3, a bracket 70 has one end secured to the cutter support housing 58 and is threadably engaged with a thread 72 at its other side. The thread 72 extends perpendicularly with respect to the plane of the frame base 16. Furthermore, the shaft 72 is rotatably driven by a motor 74. Thus, rotation of the thread 72 by the motor 74 telescopically drives the cutter support housing 58 with its attached rotary cutter 54 in a direction perpendicular to the plane of the frame base 16.

From the foregoing, it can be seen that the combination of the movable slide assembly 34, carriage assembly 40 and the telescopically mounted cutter support housing 58 enables the rotary cutter 54 to be moved independently in all three orthogonal axes. Consequently, the rotary cutter 54 can be moved to any desired x, y, z position. Furthermore, all of the motors which control the movement of the slide assembly 34, carriage assembly 40 and cutter support housing 58 are preferably controlled by a computer controlled system 76 (FIG. 1) so that the position of the rotary cutter 54 can be accurately and repeatably positioned.

With reference again to FIGS. 2–5, a great amount of debris 80 is created by the rotary cutter 54 during the cutting operation on the styrofoam workpiece 12. Preferably, this debris 80 from the workpiece is evacuated for subsequent disposal, and preferably, recycling.

In the preferred embodiment of the invention, in order to recover the workpiece debris 80, the rotary cutter 54 includes a plurality of radially extending ports 82. These radially extending ports 82 fluidly communicate with an axial bore 84 formed through the cutter 54.

The cutter axial bore 84, in turn, is fluidly connected to an elongated tube 86 (FIGS. 5 and 4) which extends axially through the cutter support housing 58. This tube 86, in turn, is telescopically slidably received within a second larger tube 88 (FIGS. 3 and 4) extending through and secured to the carriage housing 62. An upper end 90 (FIGS. 1 and 2) of the tube 88 is fluidly coupled by a hose 92 to a vacuum source 94 (FIG. 1) which inducts air along with entrained debris 80 through the rotary cutter 54, tube 86, tube 88 and hose 92 to a waste collection area. A sliding fluid seal is also provided between the telescoping tubes 88 and 86.

The telescoping tubes 86 and 88 thus enable the debris from the cutting operation to be evacuated up through the housing 58.

Figure 6:
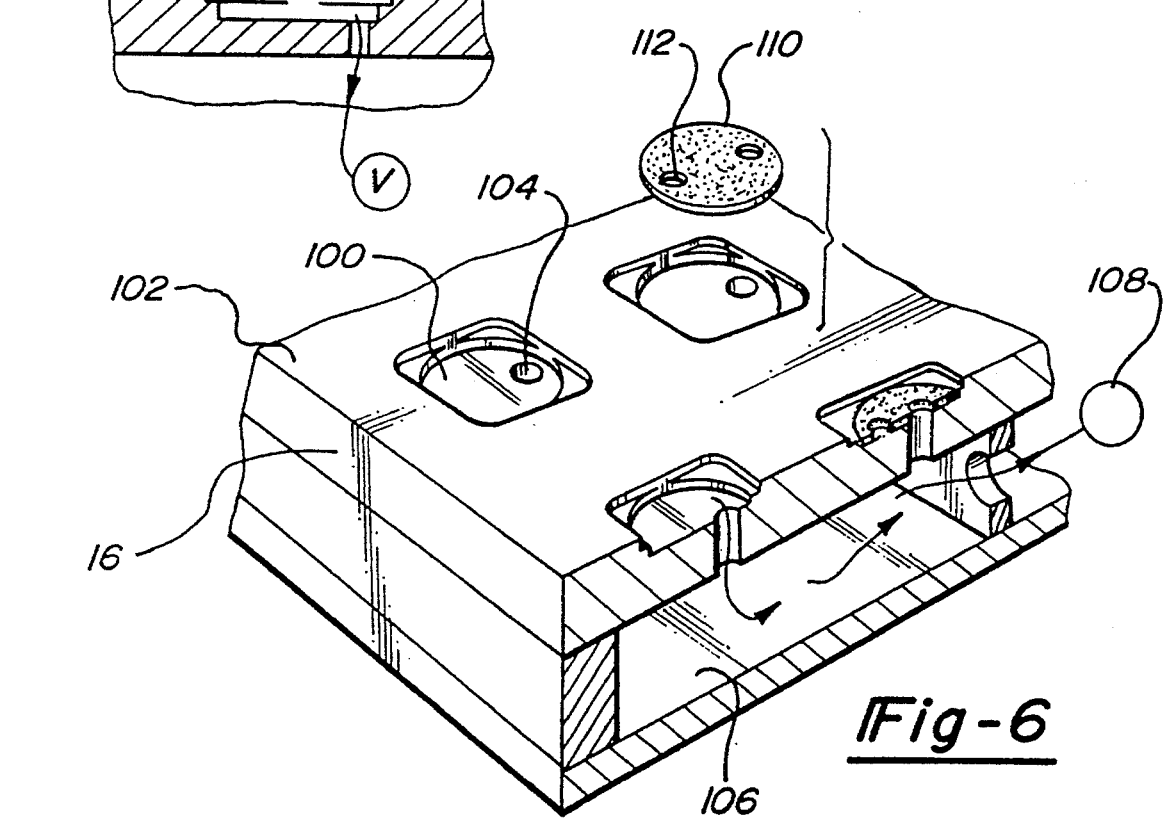
FIG. 6 is a fragmentary elevational view illustrating a portion of the frame base of the present invention.

With reference particularly to FIG. 6, in the preferred embodiment of the invention, the frame base 16 includes a plurality of spaced recesses 100 formed along its upper surface 102. Each recess 100, furthermore, includes a through bore 104 which extends from the upper surface 102 of the base 16 to a closed cavity 106 formed in the base 16. This closed cavity 106, in turn, is fluidly connected with a vacuum source 108.

A flap valve 110 is associated with each recess 100. Each flap valve 110 comprises a flexible sheet dimensioned to fit within the recess 100. Furthermore, each flap valve 110 includes at least one port 112. The flap valve 110 is positioned within the recess 100 so that the port 112 either registers with the opening 104 or is out of registration with the opening 104. When the port 112 is in registration with the opening 104, the vacuum source 108 applies a vacuum through the flap valve 110 and against a workpiece 12 positioned on top of the flap valve 110. Conversely, if the flap valve 110 is positioned so that its port 112 does not register with the opening 104 and its associated recess 100, no vacuum is applied through the flap 110.

In operation, the flap valves 110 that are positioned beneath the workpiece 12 are moved to their open position in which their ports 112 register with the openings 104 in the base 16. In doing so, the workpiece 12 is held flatly against the upper surface 102 of the base 16 by the vacuum in the desired fashion. Conversely, flap valves 110 which are not positioned under the workpiece 12 are moved to their closed position, i.e. the port 112 is not in registration with the opening 104. In doing so, the vacuum from the vacuum source 108 is applied only to the under surface of the workpiece 12.

With reference now to FIGS. 1 and 6, a closed chamber 106 in the base 16 is preferably divided into two half sections, i.e. a right half section and a left half section. A vacuum source 108 is applied by one line 114 to one of the closed chambers 106 and by a second line 116 to the second closed chamber 106. Consequently, with the workpiece 12 the machine on one half the base 16, workers can remove or position a new workpiece on the other half of the base 16 for improved work efficiency.

From the foregoing, it can be seen that the present invention provides a highly accurate system for machining workpieces made of styrofoam or like material in which the workpiece can be accurately and rapidly machined. Furthermore, the debris from the machine operation is efficiently evacuated to a collection area for recycling of the styrofoam debris.

Having described any invention, however, many modifications thereto will become apparent to those skilled in the art to which it pertains without deviation from the spirit of the invention as defined by the scope of the appended claims.

I claim:

1. A machine for cutting a workpiece made of styrofoam or like material comprising said frame, a frame having a generally planar base adapted to support the workpiece, a rotary cutter, means the rotatably driving said rotary cutter, means the movably mounting said cutter to said frame above said base, wherein said cutter removes material from the workpiece upon contact with the workpiece, means for evacuating material removed from the workpiece through openings formed in said cutter, means for attaching the workpiece to said base, said attaching means comprising at least one fluid port formed through said base, a vacuum source, means the fluidly connecting said vacuum source to said port, a plurality of fluid ports formed through said base and fluidly connected to said vacuum source, said ports being spaced apart from each other, and valve means associated with each port, said valve means be operable between an open and a closed position, wherein said base comprises a recess surrounding each fluid port and wherein valve means comprises a flap positioned in said recess, said flap having an opening formed through it, said flap being movable between a first position in which said flap opening registers with said port and a second position in which said flap overlies and covers said port.

2. The invention as defined in claim 1 wherein said cutter is cylindrical in shape and has an axial bore, said cutter openingly extending radially outwardly from said axial bore, and wherein said evacuating means comprises a vacuum source fluidly connected to said axial bore.

3. The invention as defined in claim 1 wherein said moving means comprises a slide, means for movably mounting said slide to said frame said slide is movable in a first direction parallel to the plane of said base, a carriage, means for movably mounting said carriage to said slide in a second direction said second direction being parallel to the plane of said base and perpendicular to said first direct, and means for movably mounting said cutter to said carriage in a direction substantially perpendicular to the plane of said base.

4. The invention as defined in claim 3 wherein said means for mounting said slides to said frame comprises a pair of elongated screws, means for securing said screws to said frame so that said screws are spaced apart and parallel to each other and so that an axis of each screw extends in said first direction, said slide having a pair of nuts so that one nut threadably engages one screw while the other nut threadably engages the other screw, and means for rotatably driving said nuts.

5. The invention as defined in claim 3 wherein said means for mounting said carriage to said slide comprises an elongated screw mounted to said slide, an axis of said screw extending in said second direction, a nut mounted to said carriage, said nut threadably engaging said screw, means for rotatably moving said screw and said nut relative to each other.

6. The invention as defined in claim 1 wherein said base includes at least two fluidly independent chambers, each chamber being fluidly connected to said vacuum source and each fluid chamber being in fluid communication with a plurality of said fluid ports in said base.

7. The invention as defined in claim 3 wherein said evacuating means comprises a pair of tubes; one end of one tube being in fluid communication with said cutter openings, a vacuum source, and means for fluidly connecting one end of said second tube to said vacuum source, and means for telescopically connecting the other ends of said tubes together.

* * * * *